United States Patent
Honda et al.

(10) Patent No.: US 9,122,059 B2
(45) Date of Patent: Sep. 1, 2015

(54) OPTICAL SCANNING DEVICE

(75) Inventors: Takeshi Honda, Tokyo (JP); Nobuaki Takanashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 182 days.

(21) Appl. No.: 13/824,137

(22) PCT Filed: Nov. 24, 2011

(86) PCT No.: PCT/JP2011/077027
§ 371 (c)(1),
(2), (4) Date: May 9, 2013

(87) PCT Pub. No.: WO2012/070610
PCT Pub. Date: May 31, 2012

(65) Prior Publication Data
US 2013/0229698 A1    Sep. 5, 2013

(30) Foreign Application Priority Data
Nov. 24, 2010 (JP) ................ 2010-261087

(51) Int. Cl.
*G02B 26/10* (2006.01)
*G02B 26/08* (2006.01)
(Continued)

(52) U.S. Cl.
CPC ............. *G02B 26/10* (2013.01); *G02B 7/1821* (2013.01); *G02B 26/085* (2013.01); *G02B 26/105* (2013.01); *H02K 33/16* (2013.01)

(58) Field of Classification Search
CPC ....... G02B 26/10; G02B 26/085; H02K 33/16
See application file for complete search history.

(56) References Cited

U.S. PATENT DOCUMENTS

2008/0218823 A1    9/2008    Mizoguchi
2010/0046054 A1*   2/2010    Jeong et al. ............... 359/200.7

FOREIGN PATENT DOCUMENTS

| CN | 2639915 Y      |   | 9/2004 |           |
|----|----------------|---|--------|-----------|
| CN | 101655602 A    |   | 2/2010 |           |
| JP | 2002-228905 A  | * | 8/2002 | G02B 7/00 |

(Continued)

OTHER PUBLICATIONS

Chinese Office Action for CN Application No. 201180051714.X issued on Sep. 22, 2014 with English Translation.
(Continued)

*Primary Examiner* — Joseph P Martinez
(74) *Attorney, Agent, or Firm* — Sughrue Mion, PLLC

(57) ABSTRACT

Optical scanning device 1 according to the present invention includes: main movable portion 10; a pair of torsionally deformable main torsion beams 21 and 22 arranged opposite to each other at both ends of main movable portion 10 and swingably supporting main movable portion 10; and main driving unit 30 that drives main movable portion 10 to oscillate. Main movable portion 10 includes mirror unit 11 having reflection surface 11a for reflecting light, and a pair of permanent magnets 12 and 13 arranged opposite to each other to sandwich mirror unit 11, each permanent magnet extending along oscillation axis X-X of main movable portion 10. Main driving unit 30 includes yoke unit 31, 32, and 33 arranged along oscillation axis X-X of main movable portion 10 to surround permanent magnets 12 and 13, and coil 34 wound on yoke unit 31, 32, and 33 and configured to be energized to magnetize yoke unit 31, 32, and 33, thereby generating magnetic fields to be applied on permanent magnets 12 and 13.

10 Claims, 12 Drawing Sheets

(51) Int. Cl.
*G02B 7/182* (2006.01)
*H02K 33/16* (2006.01)

(56) References Cited

FOREIGN PATENT DOCUMENTS

| JP | 2002228905 A | | 8/2002 | |
| JP | 2005169553 A | | 6/2005 | |
| JP | 2005-181430 A | * | 7/2005 | ............ G02B 26/10 |
| JP | 2005177876 A | | 7/2005 | |
| JP | 2005181430 A | | 7/2005 | |
| JP | 2007014130 A | | 1/2007 | |
| JP | 2007094109 A | | 4/2007 | |
| JP | 2008122955 A | | 5/2008 | |
| JP | 2009069676 A | | 4/2009 | |
| JP | 2010049259 A | | 3/2010 | |
| JP | 2010060592 A | | 3/2010 | |
| JP | 2010085880 A | | 4/2010 | |
| JP | 2011000556 A | | 1/2011 | |
| JP | 2011197233 A | | 10/2011 | |

OTHER PUBLICATIONS

The international search report for PCT/JP2011/077027 mailed on Dec. 20, 2011.

* cited by examiner

OPTICAL SCANNING DEVICE

This application is a National Stage Entry of PCT/JP2011/077027 filed Nov. 24, 2011, which claims priority from Japanese Patent Application 2010-261087 filed Nov. 24, 2010, the contents of all of which are incorporated herein by reference, in their entirety.

TECHNICAL FIELD

The present invention relates to an optical scanning device.

BACKGROUND ART

The optical scanning device that scans light by causing a mirror to oscillate is widely used in a digital copying machine, a laser printer, a barcode reader, a scanner, or a projector. With the recent development of a microfabrication technology, an optical scanning device, which illustrates the aforementioned device, and to which MicroElectro Mechanical Systems (MEMS) technology of is applied, has become a focus of attention.

The optical scanning device based on MEMS technology, in which a mirror mechanism can be integrally formed in a semiconductor process, is accordingly advantageous in that the device can be miniaturized. However, when a mirror size (chip size) increases, a cost problem occurs. Specifically, one wafer is expensive and, in view of yield or the number of chips actually produced therefrom, it is difficult to manufacture MEMS chips of 1 cm or more at low cost. Thus, the optical scanning device is not so suitable for use in high resolution projectors where a sufficiently large mirror size is required.

On the other hand, the optical scanning device based on MEMS technology has the following advantages. In such an optical scanning device, the mirror having both ends supported by beams that are made of an elastic member oscillates about an oscillation axis along the beams by a driving force such as an electrostatic force or an electromagnetic force, and accordingly optical scanning is carried out. Thus, unlike an optical scanning device of a type in which a polygon mirror or a galvano-mirror is rotated by a motor, a mechanical driving mechanism such as a motor is not necessary. As a result, the structure is simpler and assembling performance is higher, thereby contributing to lower costs. As compared with the aforementioned optical scanning device, the oscillation angle of the mirror can be set relatively large. This is important for realizing a projector that is capable of displaying an image on a large screen.

Thus, there is a demand for image display devices, such as projectors, that feature a large screen display and high resolution, that can be realized by applying the aforementioned advantages of the optical scanning device based on the MEMS technology to an optical device that has a large size mirror.

In the optical scanning device based on the MEMS technology, in many cases, to increase the oscillation angle of the mirror, a resonant mirror driven by the resonance frequency of the structure is used. The resonance frequency fr of the mirror is given by $$fr = (2\pi)^{-1}(k/I_m)^{1/2} \quad (1)$$

where k is a torsion spring constant of a torsion beam for supporting the mirror, and $I_m$ is the moment of inertia of the mirror.

When a driving force applied to the mirror is represented by T, the oscillation angle θ of the mirror is given by $$\theta = QT/k \quad (2)$$

where Q is a quality factor of the system, and typical values in air and vacuum are respectively about 100 and 1000.

In the resonant mirror, in many cases, high-speed vibration of about several 10 kHz as a resonance frequency fr is required. Accordingly, as the torsion beam, a torsion beam having a large torsion spring constant k, i.e., a hard torsion beam, is used (see Equation (1)). In such a case, the torsion spring constant k cancels out the quality factor Q of the mirror. As a result, oscillation angle θ of the mirror given by Equation (2) depends on driving force T. Thus, a large driving force is necessary to increase oscillation angle θ of the mirror.

On the other hand, in a certain type of optical scanning device of a certain type, a mirror is configured to be non-resonantly driven (i.e., DC-driven). In the case of this non-resonant mirror, oscillation angle θ of the mirror is given by $$\theta = T/k \quad (3)$$

where T and k are respectively a driving force applied to the mirror and torsion spring constant.

According to Equation (3), oscillation angle θ can be increased to some extent by increasing driving force T or decreasing torsion spring constant k. However, when torsion spring constant k is decreased, resonance frequency fr is decreased according to Equation (1). In such a case, since the resonance frequency approaches a driving frequency (normally, 60 Hz) in a non-resonant mode, a resonant waveform is superimposed on the driving waveform of the mirror. To prevent this, resonance frequency fr must be set to about 1 kHz or higher. As a result, torsion spring constant k cannot be greatly reduced. Thus, in the non-resonant mirror, as in the case of the resonant mirror, to increase oscillation angle θ of the mirror, the driving force must be greatly increased.

As described above, irrespective of the resonant type or the non-resonant type, to achieve a large oscillation angle of the mirror in the optical scanning device, it is important to secure a large driving force. In this regard, the use of a magnetic-force type driving device that generates a driving force with the aid of a permanent magnet and a coil is advantageous. The magnetic-force type driving devices are largely classified into the following two types depending on the arrangement of the permanent magnet and the coil.

(1) Movable Coil (MC) Type

For example, each of Patent Literatures 1 and 2 discloses a MC type driving coil in which a coil is mounted on a movable portion. A plurality of permanent magnets is disposed around the movable portion, and the movable portion is driven by Lorentz force applied on the coil when current is supplied to the coil.

(2) Movable Magnet (MM) Type

In a MM type driving device, a configuration where at least one permanent magnet is mounted on the plate surface of a platelike movable portion is frequently used. A coil is disposed near the movable portion, and the movable portion is driven by the magnetic interaction of the permanent magnet and the coil when current is supplied to the coil.

In such a driving device, various ideas for efficiently generating driving forces have been offered.

For example, Patent Literature 3 discloses a driving device including a coil disposed at a position facing the surface of a movable plate (movable portion) where a permanent magnet is mounted to incline according to the oscillation angle of the movable plate. Thus, even when the movable plate is deflected, a sufficiently large magnetic field is applied to the permanent magnet.

Patent Literature 4 discloses an optical scanner that includes a permanent magnet disposed on the rear surface of a mirror plate (movable portion) so that the magnetization direction can be horizontal, and a fixed yoke that houses a coil. The permanent magnet is held between the ends of the fixed yoke. Accordingly, a magnetic field applied to the permanent magnet through the fixed yoke can be relatively increased.

CITATION LIST

Patent Literature

Patent Literature 1: JP 2007-14130 A
Patent Literature 2: JP 2008-122955 A
Patent Literature 3: JP 2005-169553 A
Patent Literature 4: JP 2007-94109 A

SUMMARY OF INVENTION

Problems to be Solved

In the image display device such as a projector, as described above, the use of the optical scanning device that has a large mirror size is required. Thus, the driving device of the optical scanning device must generate a driving force that is larger than previously.

To increase the driving force generated in the MC type driving device as described above, the current supplied to the coil may be increased, or the number of coil turns may be increased. However, in the former case, heat is generated at the coil, causing deterioration of the optical performance of the optical scanning device carrying the coil. In the latter case, the number of coil turns has a trade-off relationship with the wire diameter of the coil, and thus it is difficult to acquire a large driving force. Specifically, the wire diameter of the coil must be reduced to increase the number of coil turns, and in this case, to prevent heat generation or disconnection, the upper limit of current to be supplied must inevitably be reduced. In a case where the wire diameter of the coil is larger, the upper limit of current to be supplied is slightly relaxed, while the number of turns itself decreases. Therefore, the MC type driving device has a problem that the desired driving force cannot be generated.

On the other hand, in the MM type driving device described in each of Patent Literatures 3 and 4, since there is less restriction on the location where the coil is to be installed, the upper limit of current to be supplied can be set high. Further, compared with the MC type driving device, a magnetic field generated at the coil can be made larger.

However, in the driving device described in Patent Literature 3, the interval between the tips of bobbins on which the coil is wound is long. This causes a larger spatial variation of the magnetic field applied to the permanent magnet, and the magnitude itself of the magnetic field is not large enough to drive the optical scanning device that has a large size mirror. Furthermore, in the driving device described in Patent Literature 4, a support column located below the mirror to support the permanent magnet is nonmagnetic. Accordingly, the column makes no contribution to the driving force, and it is difficult to generate sufficient driving force.

Similarly, in the MM type driving device as described above, sufficient driving force can be generated by increasing current supplied to the coil. However, this is undesirable because power consumption increases.

It is therefore an object of the present invention to provide a structure, in an optical scanning device that has a large size mirror, capable of generating sufficient driving force while achieving low power consumption.

Solution to Problem

To achieve the object, an optical scanning device according to the present invention includes: a main movable portion; a pair of torsionally deformed main torsion beams arranged opposite to each other at both ends of the main movable portion and swingably support the main movable portion; and a main driving unit that drives the main movable portion to oscillate. The main movable portion includes a mirror unit having a reflection surface for reflecting light, and a pair of permanent magnets arranged opposite to each other to sandwich the mirror unit, each permanent magnet extending along the oscillation axis of the main movable portion. The main driving unit includes, a yoke unit arranged along the oscillation axis X-X of the main movable portion to surround the permanent magnets, and a coil wound on the yoke unit and configured to be energized to magnetize the yoke unit, thereby generating magnetic fields to be applied on the permanent magnets.

Effects of Invention

Thus, the present invention can provide a structure, in the optical scanning device that has a large size mirror, capable of generating a sufficient driving force while achieving low power consumption.

DESCRIPTION OF EMBODIMENTS

Hereinafter, embodiments of the present invention will be described with reference to the drawings.

First Embodiment

First, an optical scanning device according to a first embodiment of the present invention will be described. The optical scanning device of this embodiment is a resonant type optical scanning device configured to operate at a resonance frequency.

Figure 1A:
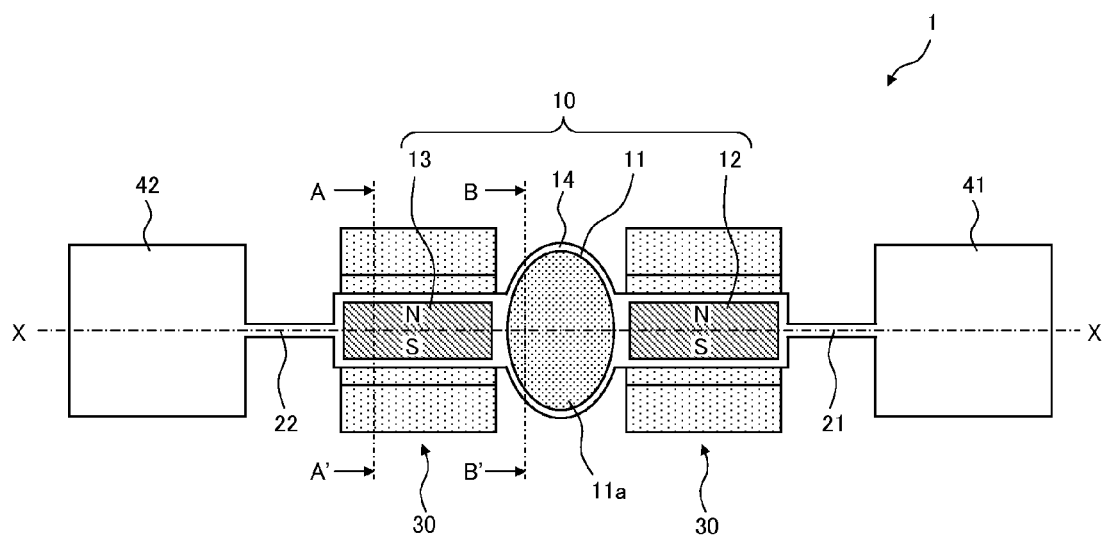
FIG. 1A is a schematic plan view showing the configuration of an optical scanning device according to a first embodiment of the present invention.
Figure 1B:
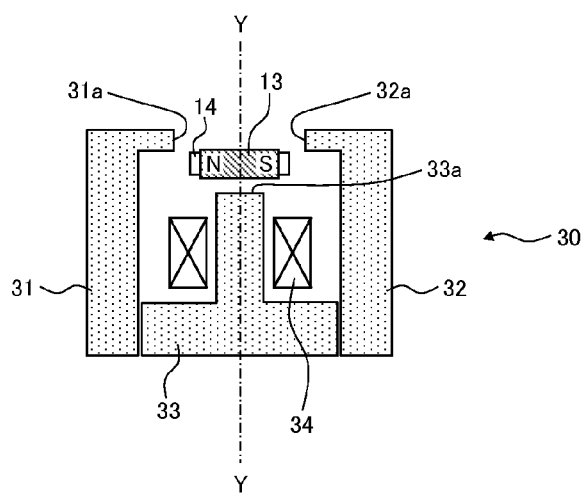
FIG. 1B is a schematic sectional view taken along line A-A' shown in FIG. 1A.
Figure 1C:
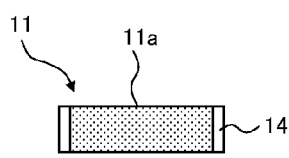
FIG. 1C is a schematic sectional view taken along line B-B' shown in FIG. 1A.

FIGS. 1A to 1C are schematic views showing the configuration of the optical scanning device of this embodiment. FIG. 1A is a schematic plan view showing the configuration of the optical scanning device of this embodiment viewed from a light reflection surface side, and FIGS. 1B and 1C are schematic sectional views respectively taken along line A-A' and line B-B' shown in FIG. 1A.

Optical scanning device 1 of this embodiment includes movable mirror (main movable portion) 10 for scanning light, and a pair of torsionally deformable main torsion beams 21 and 22 arranged opposite to each other at both ends of movable mirror 10 and connected to movable mirror 10. Movable mirror 10 is connected to supports 41 and 42 via main torsion beams 21 and 22, and thus is swingably supported by main torsion beams 21 and 22. Optical scanning device 1 further includes main driving unit 30 that drives movable mirror 10 to oscillate. Therefore, movable mirror 10 is driven by main driving unit 30 to oscillate about oscillation axis X-X along a direction in which rod-shaped main torsion beams 21 and 22 extend.

Figure 2:
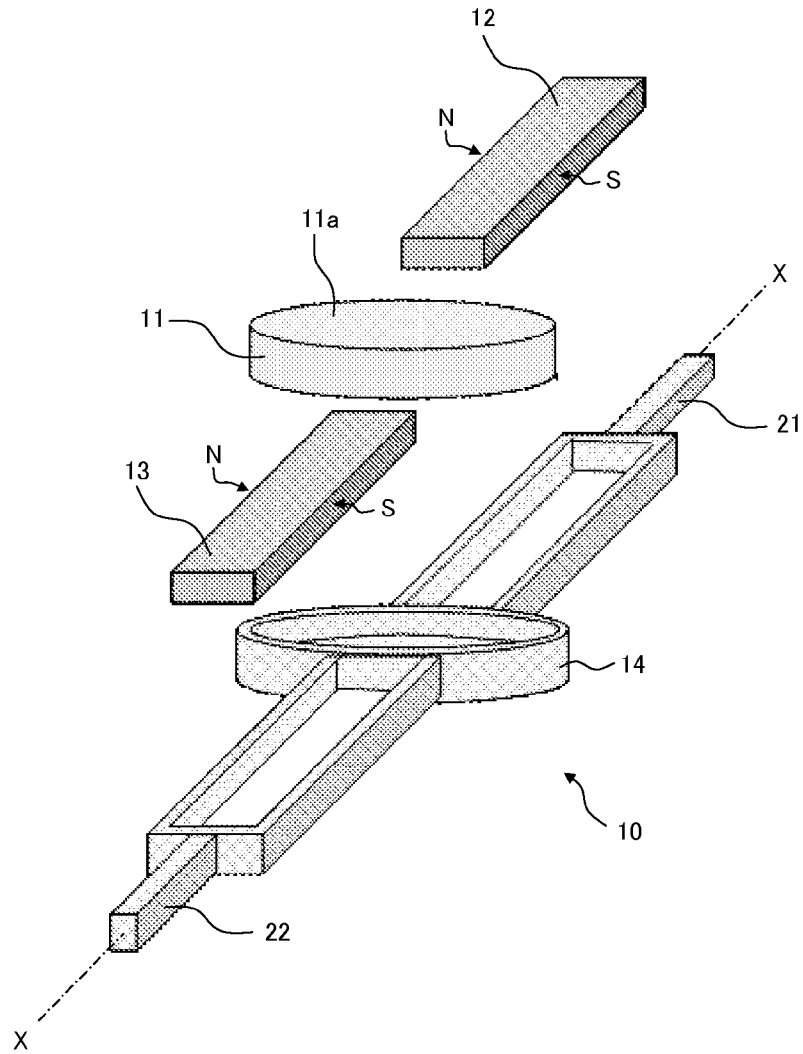
FIG. 2 is an exploded perspective view schematically showing a movable mirror of the optical scanning device shown in FIGS. 1A to 1C.

Movable mirror 10 includes mirror unit 11 that includes reflection surface 11a for reflecting light, a pair of permanent magnets 12 and 13 arranged opposite to each other to sandwich mirror unit 11, and movable frame 14 in which mirror unit 11 and the pair of permanent magnets 12 and 13 are fitted. Mirror unit 11 and permanent magnets 12 and 13 are fitted in movable frame 14, and are bonded by adhesives. FIG. 2 is a perspective view showing the specific configuration of movable mirror 10 and main torsion beams 21 and 22 according to this embodiment, and specifically shows movable mirror 10 in which mirror unit 11 and permanent magnets 12 and 13 have not been yet fitted in movable frame 14.

Movable frame 14 that is made of an moderately rigid and elastic material is formed integrally with main torsion beams 21 and 22, and is connected to the support (not shown in FIG. 2) via main torsion beams 21 and 22. As material for movable frame 14 and main torsion beams 21 and 22, in this embodiment, elastic metallic material such as stainless steel or molybdenum, or single-crystal silicon is preferably used.

As shown in FIG. 1A, mirror unit 11 includes elliptical reflection surface la, and is disposed so that its short-axis direction can be substantially coaxial to the oscillation axis X-X of movable mirror 10. In other words, mirror unit 11 is disposed to be substantially rotationally-symmetrical with respect to the oscillation axis X-X of movable mirror 10. Thus, the moment of inertia of mirror unit 11 can be reduced. This is advantageous in that the torsion spring constants of main torsion beams 21 and 22 for acquiring a predetermined resonance frequency (e.g., 4 kHz) can be reduced (see Equation (1)), thereby achieving a larger oscillation angle even with the same driving force.

In reflection surface 11a of mirror unit 11, a mirror surface of a sufficiently flat metal thin film or dielectric multilayer that are made of a material having a sufficiently high reflectance for light to be used, is formed. In this embodiment, mirror unit 11 including such a mirror surface is, as described above, formed separately from movable frame 14, and is fitted in the opening of movable frame 14. Such a configuration is advantageous not only in that it contributes to lower costs because of easy assembling of movable mirror 10 and easy processing of mirror unit 11 itself, but also in that mirror unit 1 can be made of a material different from that of movable frame 14 and main torsion beams 21 and 22. In other words, mirror unit 11 is made of a material whose density is lower than that constituting movable frame 14 and main torsion beams 21 and 22. This enables reduction of the moment of inertia of movable mirror 10.

The dimensions of mirror unit 11 are, for example, as follows: the long axis (mirror width) of reflection surface 11a is 6 mm, the short axis (mirror length) is 3 mm, and the thickness is 0.3 mm. In this case, the dimensions of movable frame 14 are, for example, as follows: the thickness of the elliptical portion in which mirror unit 11 is fitted is 0.3 mm, and the frame width is 0.7 mm.

Instead of being formed separately from the movable frame, the mirror unit can be configured by directly forming the mirror surface in the platelike movable frame.

Permanent magnets 12 and 13 are arranged at both ends of mirror unit 11 to extend along the oscillation axis X-X of movable mirror 10. In this case, as shown in FIGS. 1A to 2, the side faces of permanent magnets 12 and 13 extending along the oscillation axis X-X of movable mirror 10 are respectively magnetized to a N pole and a S pole, and accordingly the magnetization direction thereof is substantially orthogonal to the oscillation axis X-X of movable mirror 10. In this embodiment, permanent magnets 12 and 13 are arranged with respect to mirror unit 11 so that the magnetization direction can be substantially parallel to reflection surface 11a of mirror unit 11. A configuration of main driving unit 30 described below is determined according to the arrangement of permanent magnets 12 and 13 and mirror unit 11.

From the standpoint of reducing the moment of inertia, as in the case of mirror unit 11, each of permanent magnets 12 and 13 are preferably disposed to be rotationally symmetrical with respect to the oscillation axis X-X of movable mirror 10.

Main torsion beams 21 and 22 are, as described above, formed integrally with movable frame 14, and swingably support movable mirror 10. The dimensions of main torsion beams 21 and 22 are determined according to the dimensions of movable mirror 10. Specifically, a torsion spring constant is determined by Equation (1) so that movable mirror 10 having the moment of inertia acquired from the dimensions of mirror unit 11 and permanent magnets 12 and 13 that are to be used can oscillate at a predetermined resonance frequency, and the dimensions of main torsion beams 21 and 22 are accordingly determined.

Main driving unit 30 includes yoke unit 31, 32, and 33 consisting of three components, as shown in FIG. 1B, and these components are arranged along the oscillation axis X-X of movable mirror 10 to surround permanent magnets 12 and 13.

Three components 31, 32, and 33 of the yoke unit each have an end that is arranged opposite to permanent magnets 12 and 13. First and second yokes 31 and 32 respectively have first and second ends 31a and 32a that are arranged opposite to each other to sandwich permanent magnets 12 and 13. Third yoke 33 has third end 33a that is arranged opposite to permanent magnets 12 and 13 in a direction substantially orthogonal to the magnetization direction of permanent magnets 12 and 13. Yoke unit 31, 32, and 33 thus configured is arranged to be symmetrical with respect to plane Y-Y that includes oscillation axis X-X of movable mirror 10 and is substantially orthogonal to the magnetization direction of permanent magnets 12 and 13. The dimensions of yoke unit 31, 32, and 33 are, for example, as follows: the gap between first and third ends 31a and 33a and the gap between second and third ends 32a and 33a are within a range of 1 to 2 mm.

Main driving unit 30 further includes coil 34 wound on third yoke 33 and configured to be energized to magnetize yoke unit 31, 32, and 33, thereby generating magnetic fields to be applied on permanent magnets 12 and 13 of movable mirror 10. As described below in detail, coil 34 according to this embodiment is configured to form different magnetic poles in first and second ends 31a and 32a and third end 33a when energized. The number of turns of coil 34 is, for example, 200.

The magnitude of magnetic field H generated between gaps g is approximately represented by H=NI/g, where g is gaps between first and third ends 31a and 33a and between second and third ends 32a and 33a, and N and I are respectively the number of turns of coil 34 and the current of coil 34. For example, when the number of coil turns N is 200, current I is 200 mA, and a gap g is 2 mm, magnetic field H applied on permanent magnets 12 and 13 is $2 \times 10^4$ A/m (250 Oe). Such dimensions and the magnitude of the magnetic field are realistically designable values.

Next, referring to FIGS. 3A and 3B, the oscillating movement of movable mirror 10 according to this embodiment will be described.

Figure 3A:
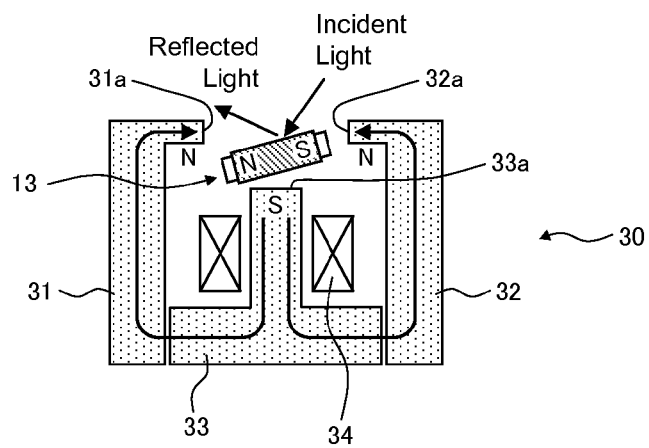
FIG. 3A is a schematic sectional view showing the oscillation state of the movable mirror in the optical scanning device shown in FIG. 1B.
Figure 3B:
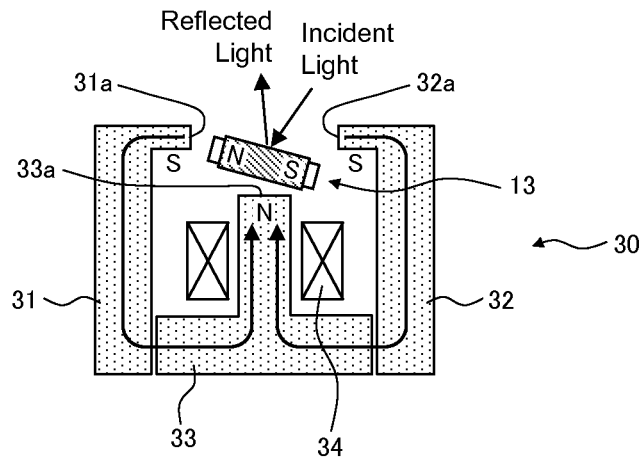
FIG. 3B is a schematic sectional view showing the oscillation state of the movable mirror in the optical scanning device shown in FIG. 1B.

FIGS. 3A and 3B are schematic sectional views of optical scanning device 1 for describing the movement of movable mirror 10 of this embodiment, each corresponding to FIG. 1B.

When coil 34 of main driving unit 30 is energized, magnetic fluxes are generated in first to third yokes 31, 32, and 33, and magnetic poles are formed in first to third ends 31a, 32a, and 33a. In this case, as shown in FIGS. 3A and 3B, magnetic poles of the same type are formed in first and second ends 31a and 32a, while a different magnetic pole is formed in third end 33a. As a result, magnetic fields are generated between first end 31a and third end 33a and between second end 32a and third end 33a.

When the current of a predetermined direction is supplied to coil 34, as shown in FIG. 3A, N poles are generated at first and second ends 31a and 32a, while a S pole is generated at third end 33a. Accordingly, magnetic fields are respectively generated from first and second ends 31a and 32a toward third end 33a. The magnetic fields are applied on permanent magnet 13, and permanent magnet 13 (i.e., movable mirror) is inclined left as shown so that the S pole of permanent magnet 13 and the N pole of second yoke 32a can attract each other.

On the other hand, when the current that flows in a direction opposite to the predetermined direction is supplied to coil 34, as shown in FIG. 3B, S poles are generated at first and second ends 31a and 32a, while a N pole is generated at third end 33a. Accordingly, magnetic fields are respectively generated from third end 33a toward first and second ends 31a and 32a. The magnetic fields are applied on permanent magnet 13, and permanent magnet 13 (i.e., movable mirror) is inclined right as shown so that the N pole of permanent magnet 13 and the S pole of first end 31a can attract each other.

Therefore, light incident at a certain angle can be, for example, reflected at a shallow angle on one hand (see FIG. 3A), and reflected at a deep angle on the other hand (see FIG. 3B). Thus, the angle of scanning light can be arbitrarily set by changing the direction and the magnitude of the current flowing through coil 34.

Now, the shapes of permanent magnets 12 and 13 of this embodiment will be described by taking a specific example.

Figure 4:
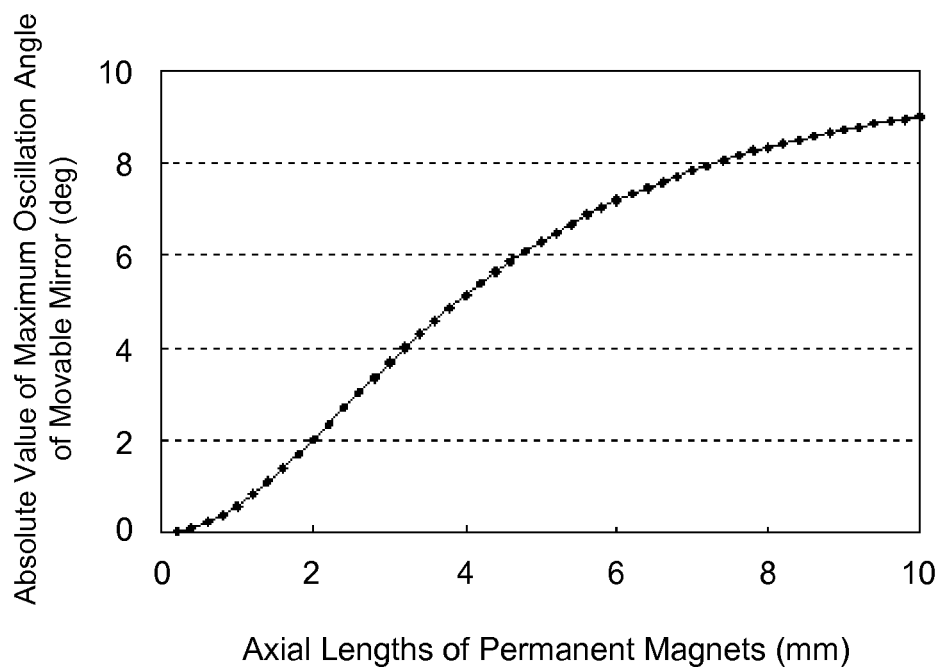
FIG. 4 is a view plotting the absolute value of the maximum oscillation angle of the movable mirror shown in FIGS. 1A to 1C with respect to the axial lengths of permanent magnets.

FIG. 4 shows the result of calculating, for movable mirror 10 shown in FIGS. 1A to 2, the oscillation angle of movable mirror 10 when the axial lengths (i.e., lengths along the oscillation axis X-X of movable mirror 10) of permanent magnets 12 and 13 are changed with the volumes and the thicknesses (i.e., lengths vertical to reflection surface 11a) of permanent magnets 12 and 13 kept constant. A vertical axis indicates the absolute value of the maximum oscillation angle of movable mirror 10. The resonance frequency of movable mirror 10 was 4 kHz, the volume and the thickness of each of permanent magnets 12 and 13 were respectively 3.6 mm$^3$ and 0.3 mm, and the magnetization of permanent magnets 12 and 13 was 1.3 T. A magnetic field applied to permanent magnets 12 and 13 was $10^4$ A/m, and a mechanical quality factor was 50. The magnetic field of this magnitude can be generated by coil 34 (current is 50 mA) with 200 turns that is wound on main driving unit 30 having the gap of 1 mm, and the mechanical quality factor is also reasonable.

It can be understood from FIG. 4 that the maximum oscillation angle of movable mirror 10 increases as the axial lengths of permanent magnets 12 and 13 become longer. This is because the widths (i.e., lengths along the long-axis direction of reflection surface 11a) of permanent magnets 12 and 13 decrease in inverse proportion to the axial lengths, thereby lowering the moment of inertia of permanent magnets 12 and 13. In other words, according to a change in the moment of inertia, the torsion spring constants of main torsion beams 21 and 22 for acquiring a predetermined resonance frequency (e.g., 4 kHz) can be reduced (see Equation (1)). As a result, movable mirror 10 can be largely oscillated. Accordingly, the axial length of main driving unit 30 is made longer, and the volume and DC resistance slightly increase. However, these are not major problems.

The excessively long axial length of the permanent magnet is not appropriate for a device shape. Thus, in this embodiment, permanent magnets 12 and 13 are preferably flat rectangular solids extending in the axial direction. The dimensions of each of permanent magnets 12 and 13 are, for example, as follows: the axial length is 6 mm, the width is 2 mm, and the thickness is 0.3 mm.

Next, the oscillation angle (i.e., rotational angle) of movable mirror 10 will be described by taking a specific example.

In FIGS. 3A and 3B, the oscillation angle θ(t) of movable mirror 10 from its static position (see FIG. 1B) is derived from the equation of motion shown below.

$$I(d^2/dt^2)\theta(t)+k_\theta\theta(t)+b(d/dt)\theta(t)-MH(t)\cos(\theta_0-\theta(t))=0 \quad (4)$$

I: Moment of inertia of movable mirror 10
H(t): Applied magnetic field at positions of permanent magnets 12 and 13
M: Magnetic moment (pointing to left in horizontal direction) of movable mirror 10
$k_\theta$: Torsion spring constants of main torsion beams 21 and 22
b: Damping factor
$\theta_0$: Inclination angle of applied magnetic field H(t) with respect to vertical direction For θ(t) and $\theta_0$, clockwise rotation in FIGS. 3A and 3B is assumed to be a positive direction, and the magnitude of the applied magnetic field H(t) is assumed to be uniform for the sake of simplicity. The moment of inertia I of movable mirror 10 is assumed to be moment of inertia of mirror unit 11 including the material of the mirror surface and permanent magnets 12 and 13.

The solution of the equation of motion shown in Equation (4) is approximately given as follows assuming $H(t)=H_0 \sin(\omega t)$, $\theta_0=0$, and θ(t) set equal to or lower than 10°:

$$\theta(t)=(QMH_0/k_\theta)\sin(\omega t+\phi) \quad (5)$$

where ωt and φ are respectively the angular frequency and the phase shifting of AC current flowing through coil 34. Q is the mechanical quality factor of the system, which is normally several 10 to 100 in air.

When the resonance frequency fr of movable mirror 10 is 4 kHz, neodymium magnets are used for permanent magnets 12 and 13, dimensions thereof are 2×6×0 3 mm³, an applied magnetic field $H_0$ is 2×10⁴ A/m, and the mechanical quality factor of 50, the maximum oscillation angle of movable mirror 10 is ±7°. Accordingly, light can be scanned within the range of ±14°.

In this embodiment, since the magnitude of the applied magnetic field necessary for acquiring such an oscillation angle of movable mirror 10 is about 2×10⁴ A/m, current supplied to coil 34 can be small, and thus power consumption can be low. When AC current having a predetermined frequency (e.g., 4 kHz) is supplied to coil 34, impedance is generated according to the inductance of coil 34, in addition to the wiring resistance (e.g., 1Ω) of coil 34. Even in such a case, by serially inserting a capacitor into a current circuit to constitute a LCR resonance circuit, the impedance of the current circuit can be reduced to be about equal to the wiring resistance, and power consumption can be reduced.

As described above, according to this embodiment, by arranging the pair of permanent magnets at both ends of the mirror unit along the oscillation axis of the movable mirror, the yoke unit on which the coil is wound can be arranged to surround the permanent magnets. Thus, not only the gap between the yoke end where the magnetic pole is formed and the permanent magnet but also the gap between the yoke ends can be narrowed. In addition, since the permanent magnet is disposed along the oscillation axis of the movable mirror, the gap between the yoke end and the permanent magnet can be maintained narrow even when the movable mirror oscillates largely. Thus, irrespective of the oscillation state of the movable mirror, interaction between the permanent magnet and the magnetic field generated between the yoke ends can be increased. As a result, even when only a relatively small amount of current flows, a sufficiently large driving force can be generated. This enables acquiring the large oscillation angle of the movable mirror, and thereby optical scanning can be carried out over a wide range.

Now, the configuration and the operation of an image display device that includes the optical scanning device of this embodiment will be described.

Figure 5:
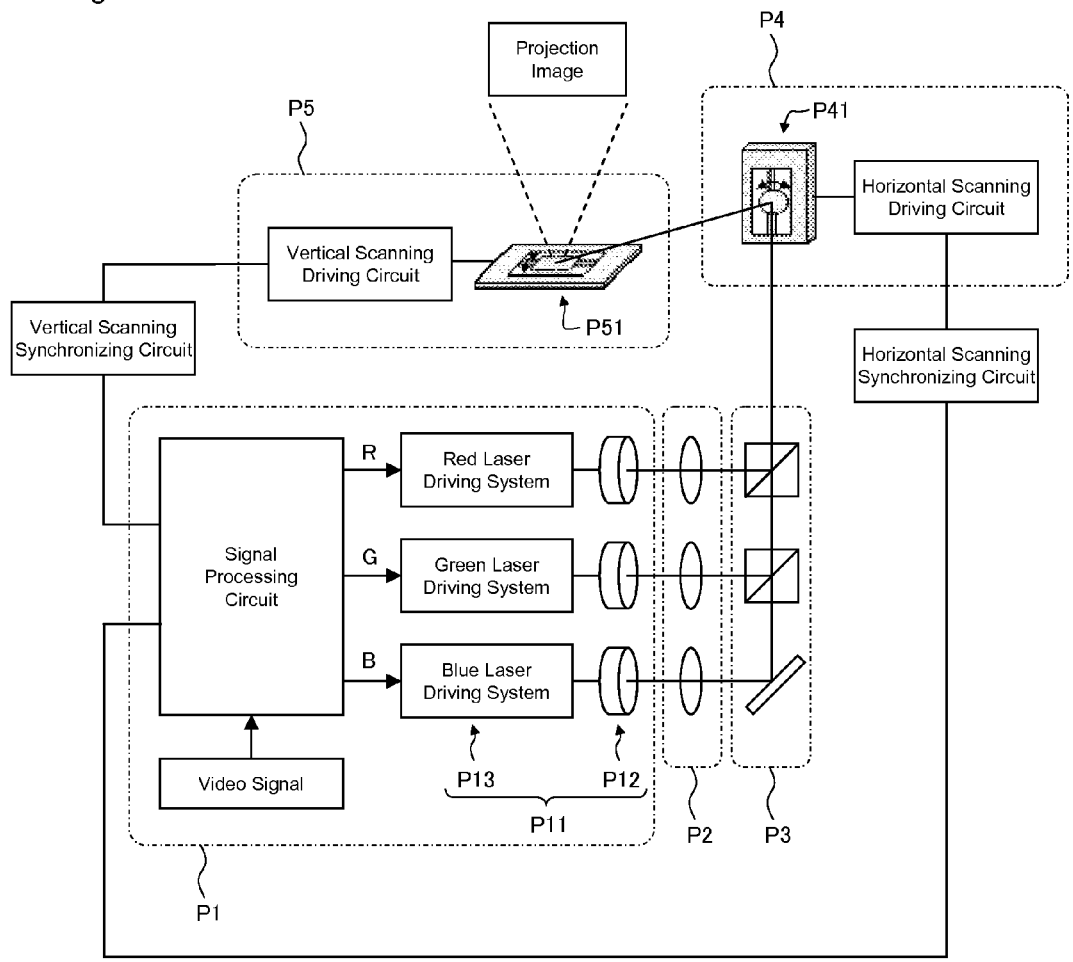
FIG. 5 is a view showing a configuration example of an image display device that includes the optical scanning device of the present invention.

FIG. 5 shows a configuration example of the image display device that includes the optical scanning device of this embodiment.

The image display device includes light flux generation device P1 for generating a light flux of each color modulated according to a video signal supplied from the outside, collimator optical system P2 for converting each light flux generated by light flux generation device P1 into collimated light beam, and beam combiner P3 for synthesizing light fluxes converted into collimated light beam. Furthermore, the image display device includes horizontal scanning unit P4 for scanning the light beam synthesized by beam combiner P3 in a horizontal direction to display an image, vertical scanning unit P5 for scanning the light beam scanned in the horizontal direction by horizontal scanning unit P4 in a vertical direction, and an optical system (not shown) for emitting the light beam scanned in the horizontal and vertical directions onto a screen. The optical scanning device of this embodiment is incorporated into the image display device as scanning mirror P41 of horizontal scanning unit P4.

Light flux generation device P1 includes a signal processing circuit that receives a video signal, generates a signal as an element for constituting an image based on the input signal, and outputs a horizontal synchronous signal used by the horizontal scanning unit and a vertical synchronous signal used by the vertical scanning unit. In this signal processing circuit, video signals of red (R), green (G), and blue (B) are generated.

Light flux generation device P1 further includes light source unit P11 for converting the three video signals (R, G, and B) output from the signal processing circuit into light fluxes. Light source unit P11 includes laser P12 for generating a light flux of each color of the video signal, and laser driving system P13 for driving laser P12. For each laser, a semiconductor laser or a solid laser having a second harmonic generation (SHG) mechanism is preferably used.

The light flux of each color output from each laser P12 of light flux generation device P1 is converted into collimated light beam by collimator optical system P2, and then entered into a dichroic mirror of beam combiner P3 that corresponds to each color. The light fluxes of the respective colors made incident on the three dichroic mirrors are wavelength-selectively reflected or transmitted to be synthesized, and output to horizontal scanning unit P4.

At horizontal scanning unit P4 and vertical scanning unit P5, the light beam incident on horizontal scanning unit P4 is projected as an image by scanning mirrors P41 and P51 in the horizontal and vertical directions. Scanning mirrors P41 and P51 are driven by a scanning driving circuit based on the synchronous signals output from the signal processing circuit and input through the scanning synchronizing circuit.

Second Embodiment

Figure 6A:
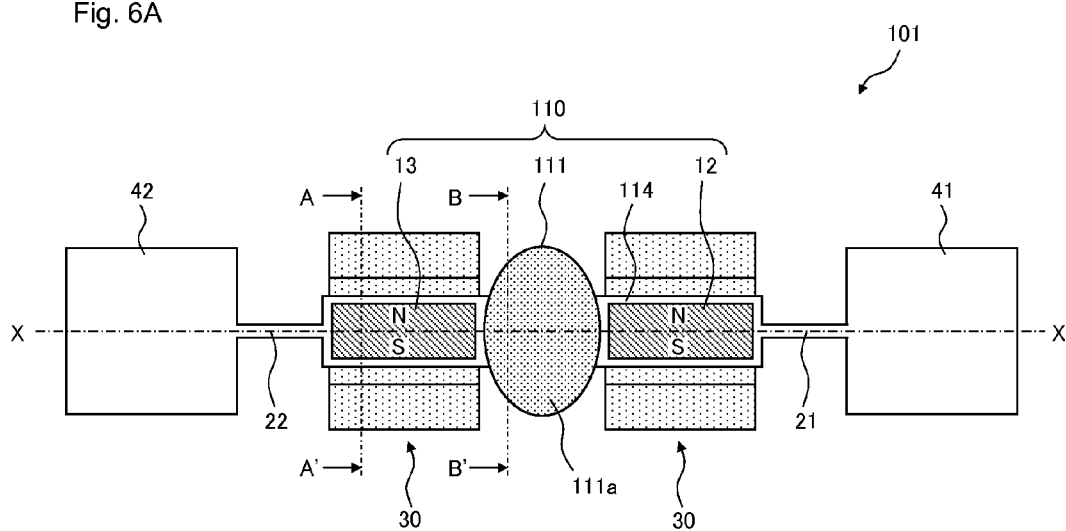
FIG. 6A is a schematic plan view showing the configuration of an optical scanning device according to a second embodiment of the present invention.
Figure 6B:
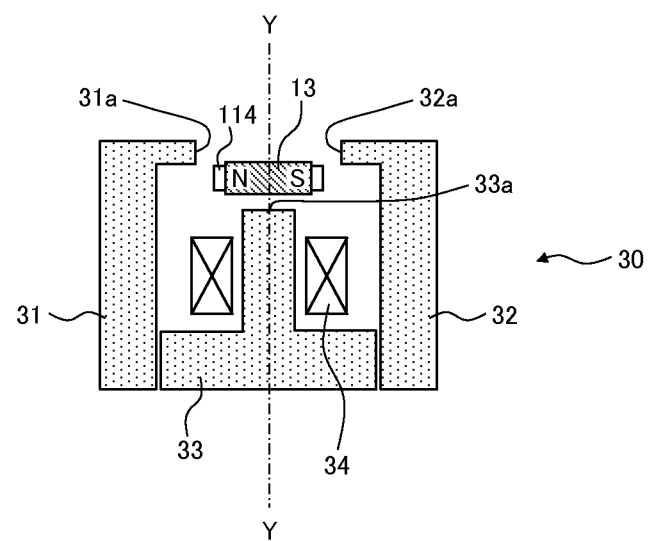
FIG. 6B is a schematic sectional view taken along line A-A' shown in FIG. 6A.
Figure 6C:
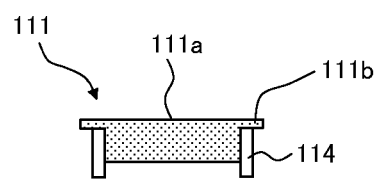
FIG. 6C is a schematic sectional view taken along line B-B' shown in FIG. 6A.

FIGS. 6A to 6C are schematic views showing the configuration of an optical scanning device of a second embodiment of the present invention. FIG. 6A is a schematic plan view showing the optical scanning device of this embodiment viewed from a light reflection surface side, corresponding to FIG. 1A. FIGS. 6B and 6C are schematic sectional views respectively taken along line A-A' and line B-B' shown in FIG. 6A.

This embodiment is a modification of the first embodiment where the configuration of the mirror unit (accordingly, as well as the movable frame) is changed. Specifically, mirror unit 11 of the first embodiment has a rectangular cross section vertical to reflecting surface 11a as shown in FIG. 1C, while mirror unit 111 of this embodiment includes flange 111b formed in the outer peripheral portion of reflection surface 111a as shown in FIG. 6C. The size of the elliptical portion of movable frame 114 in which mirror unit 111 is fitted is accordingly changed. Other components are similar to those of the first embodiment, and a movement mechanism is also similar to that of the first embodiment. In this embodiment and embodiments described below, members similar to those of the first embodiment are denoted by similar reference numerals shown, and description thereof will be omitted.

Figure 7A:
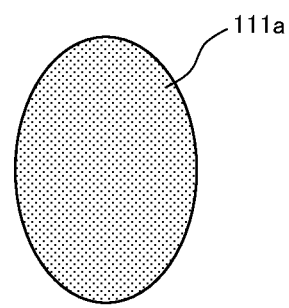
FIG. 7A is a schematic plan view showing a mirror unit in the optical scanning device shown in FIGS. 6A to 6C.
Figure 7B:
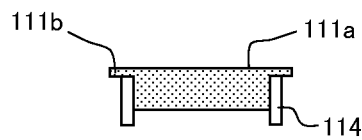
FIG. 7B is a schematic sectional view showing the mirror unit in the optical scanning device shown in FIGS. 6A to 6C.
Figure 7C:
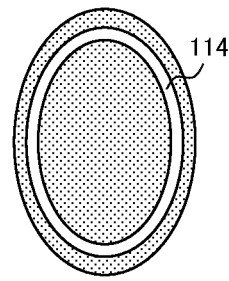
FIG. 7C is a schematic plan view showing the mirror unit in the optical scanning device shown in FIGS. 6A to 6C.

FIGS. 7A to 7C are schematic views showing mirror unit 111 according to this embodiment. FIGS. 7A to 7C are schematic plan views showing mirror unit 111 viewed from above and below. FIG. 7A shows reflection surface 111a side. FIG. 7B is a schematic sectional view similar to FIG. 6C.

Mirror unit 111 of this embodiment includes, as described above, flange 111b formed in the outer peripheral portion of reflection surface 111a. Flange 111b, which can be formed by etching normally carried out in glass, is engaged with the elliptical portion of movable frame 114 when mirror unit 111 is fitted in movable frame 114. Mirror unit 111 is fixed by bonding flange 111b to the elliptical portion of movable frame 114 by an adhesive. As material for movable frame 114, as in the case of the first embodiment, an elastic metallic material such as stainless steel or molybdenum, or single-crystal silicon can be used. In this embodiment, the molybdenum is preferably used.

Figure 8:
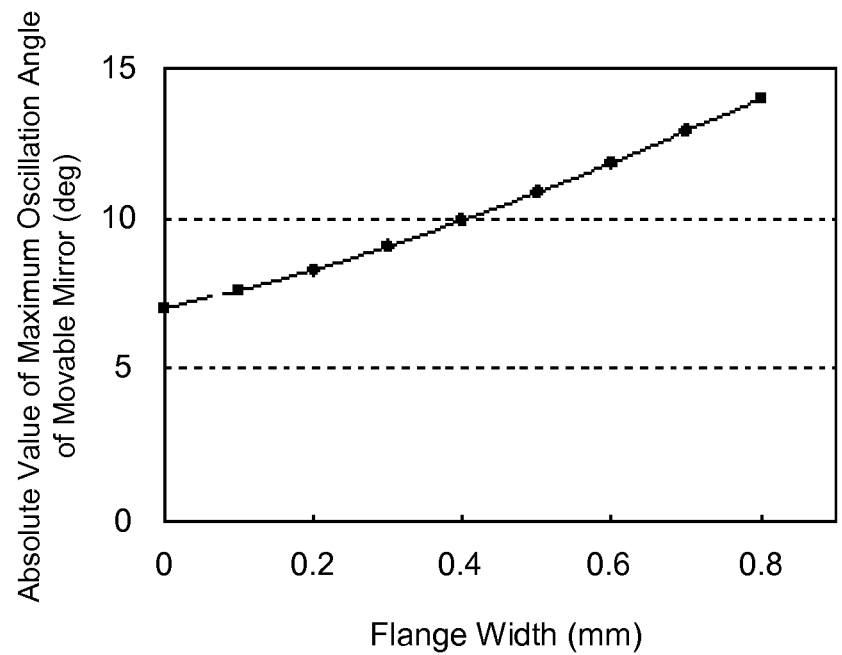
FIG. 8 is a view plotting the absolute value of the maximum oscillation angle of the movable mirror shown in FIGS. 6A to 6C with respect to a flange width.

FIG. 8 shows the result of calculating the oscillation angle of movable mirror 110 when the width of flange 111b (i.e., flange width) is changed with the size of reflection surface 111a (i.e., mirror length and mirror width) kept constant. A vertical axis indicates the absolute value of the maximum oscillation angle of movable mirror 110. The mirror length and the mirror width of mirror unit 111 were respectively 3 mm and 6 mm, the thickness of flange 111b was 0.05 mm, and the thickness of mirror unit 111 where flange 111b is not formed was 0.3 mm. Thus, when the flange width is 0 mm, it corresponds to the case of the first embodiment. Calculation was carried out under the same conditions as those of the calculation shown in FIG. 4. The axial lengths of permanent magnets 12 and 13 were 6 mm, widths were 2 mm, and thicknesses were 0.3 mm.

It can be understood from FIG. 8 that the maximum oscillation angle of movable mirror 110 increases as the flange width becomes larger. For example, when the flange width is 0.8 mm, the maximum oscillation angle of movable mirror 110 is ±14° (scanning angle±28°), which is about twice as large as that in the case of 0 mm (i.e., in the first embodiment). Thus, the flange width is preferably as large as possible. However, when the flange width is larger, the strength of the reflection surface drops, thereby inducing deflection. In practice, therefore, the flange width may be selected according to optical characteristics required for scanning light.

As described above, according to this embodiment, since there is formed flange 111b, while the size of reflection surface 111a is equal to that of the first embodiment, the moment of inertia of mirror unit 111 and movable frame 114 can be reduced as compared with the first embodiment. As a result, the torsion spring constants of main torsion beams 21 and 22 for acquiring a predetermined resonance frequency can be reduced, and the oscillation angle of the movable mirror can be set larger.

Third Embodiment

Figure 9A:
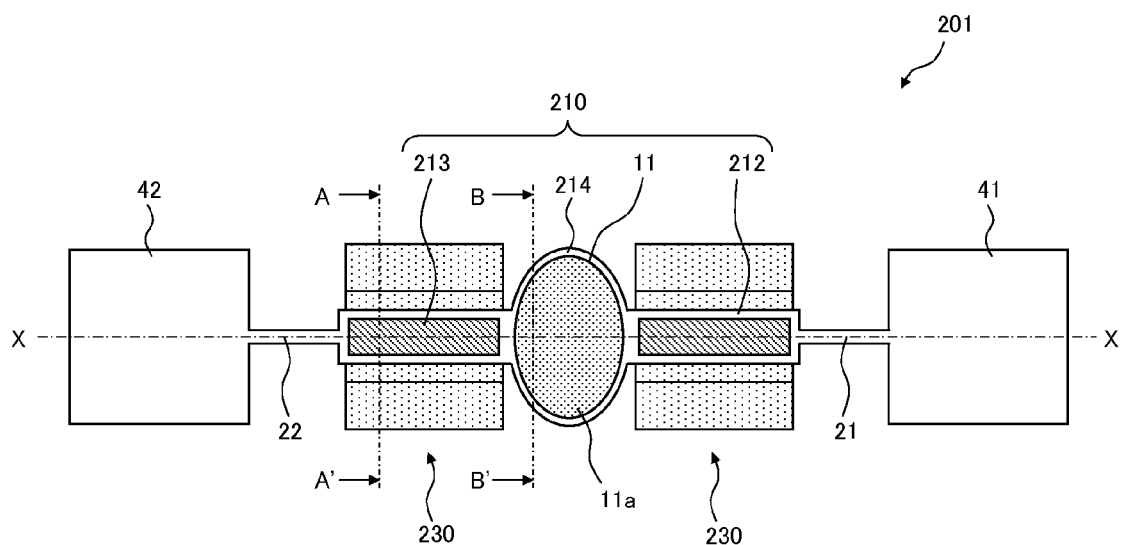
FIG. 9A is a schematic plan view showing the configuration of an optical scanning device according to a third embodiment of the present invention.
Figure 9B:
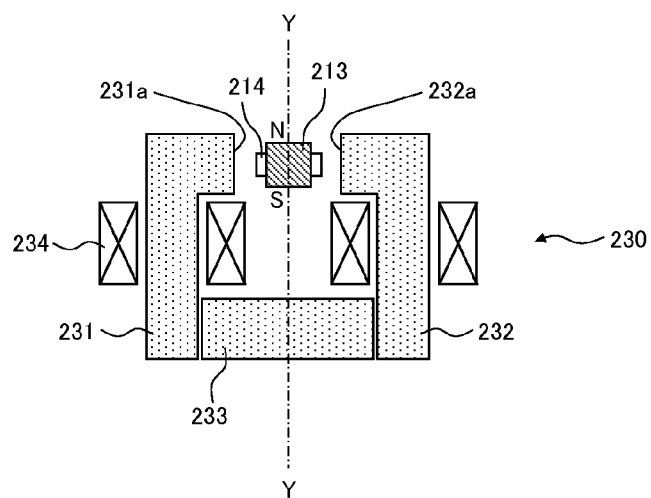
FIG. 9B is a schematic sectional view taken along line A-A' shown in FIG. 9A.
Figure 9C:
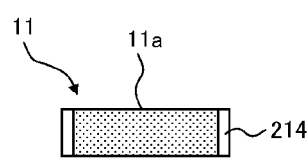
FIG. 9C is a schematic sectional view taken along line B-B' shown in FIG. 9A.

FIGS. 9A to 9C are schematic views showing the configuration of an optical scanning device of a third embodiment of the present invention. FIG. 9A is a schematic plan view showing the optical scanning device of this embodiment viewed from a light reflection surface side, corresponding to FIG. 1A. FIGS. 9B and 9C are schematic sectional views respectively taken along line A-A' and line B-B' shown in FIG. 9A.

This embodiment is a modification of the first embodiment where the configuration of the permanent magnets and the main driving unit are changed. Specifically, the magnetization direction of the permanent magnet of this embodiment is rotated by 90° around the oscillation axis of a movable mirror with respect to the magnetization direction of the first embodiment, and the shape of the permanent magnet (accordingly, as well as the movable frame) and the configuration of the yoke are accordingly changed. Other components are similar to those of the first embodiment. As material for the movable frame, molybdenum is preferably used as in the case of the second embodiment.

As shown in FIG. 9B, permanent magnets 212 and 213 of this embodiment are arranged so that the magnetization direction thereof can be substantially orthogonal to reflection surface 11a of mirror unit 11, i.e., substantially parallel to plane Y-Y. Accordingly, in main driving unit 230, only first and second yokes 231 and 232 respectively have ends 231a and 232a that are arranged opposite to each other to sandwich permanent magnets 212 and 213. Coil 234 is wound on first and second yokes 231 and 232, and energized to form different magnetic poles in first end 231a and second end 232a as described below in detail. The number of turns of coil 234 is, for example, 200. As in the aforementioned case, in this embodiment, first to third yokes 231, 232, and 233 are arranged to be symmetrical with respect to plane Y-Y including the oscillation axis X-X of movable mirror 210.

Next, referring to FIGS. 10 and 10B, the oscillating movement of movable mirror 210 according to this embodiment will be described.

Figure 10A:
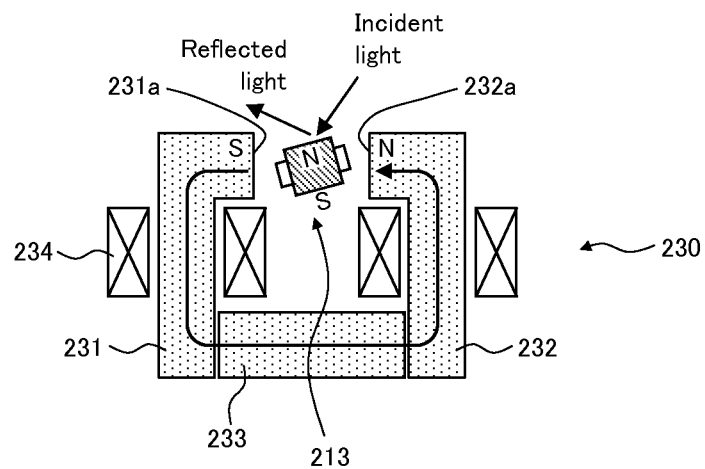
FIG. 10A is a schematic sectional view showing the oscillation state of a movable mirror in the optical scanning device shown in FIG. 9B.
Figure 10B:
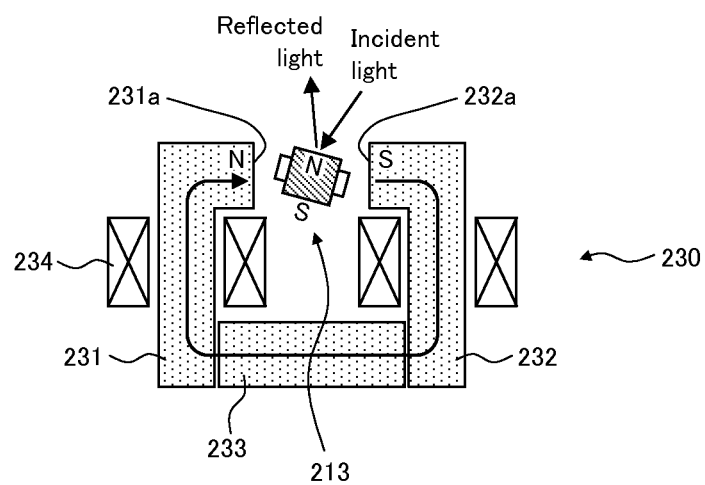
FIG. 10B is a schematic sectional view showing the oscillation state of the movable mirror in the optical scanning device shown in FIG. 9B.

FIGS. 10A and 10B are schematic sectional views of optical scanning device 201 for describing the movement of movable mirror 210 of this embodiment, each corresponding to FIG. 9B.

When coil 234 of main driving unit 230 is energized, magnetic fluxes are generated in first to third yokes 231, 232, and 233, and different magnetic poles are formed in first and second ends 231a and 232a as shown in FIGS. 10A and 10B. As a result, a magnetic field is generated between ends 231a and 232a.

When the current of a predetermined direction is supplied to coil 234, as shown in FIG. 10A, a S pole is generated at first end 231a, while a N pole is generated at second end 232a. Accordingly, a magnetic field is generated from second end 232a toward first end 231a. The magnetic field is applied on permanent magnet 213, and permanent magnet 213 (i.e., movable mirror) is inclined left as shown so that the N pole of permanent magnet 213 and the S pole of first end 231a can attract each other.

On the other hand, when the current that flows in a direction opposite to the predetermined direction is supplied to coil 234, as shown in FIG. 10B, a N pole is generated at first end 231a, while a S pole is generated at second end 232a. Accordingly, a magnetic field is generated from first end 231a toward second end 232a. The magnetic field is applied on permanent magnet 213, and permanent magnet 13 (i.e., movable mirror) is inclined right as shown so that the N pole of permanent magnet 213 and the S pole of second end 232a can attract each other.

Therefore, light incident at a certain angle can be, for example, reflected at a shallow angle on one hand (see FIG. 10A), and reflected at a deep angle on the other hand (see FIG. 10B). Thus, the angle of scanning light can be arbitrarily set by changing the direction and the magnitude of the current flowing through coil 234.

Figure 11:
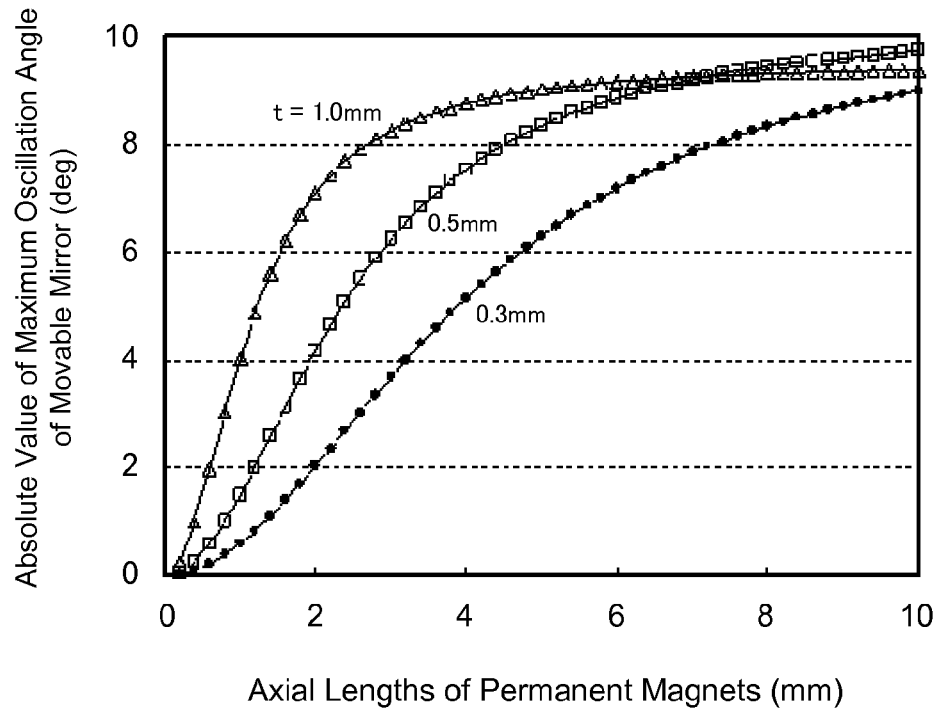
FIG. 11 is a view plotting the absolute value of the maximum oscillation angle of the movable mirror shown in FIGS. 9A to 9C with respect to the axial lengths of permanent magnets.

Now, the shapes of permanent magnets 212 and 213 of this embodiment will be described by taking a specific example. FIG. 11 shows the result of calculating, for movable mirror 210 shown in FIGS. 9A to 9C, the oscillation angle of movable mirror 210 when the axial lengths and the thicknesses of permanent magnets 212 and 213 are changed with the volumes of permanent magnets 212 and 213 kept constant. In the shown example, the thicknesses t of permanent magnets 212 and 213 are respectively t=0.3 mm, 0.5 mm, and 1.0 mm. A vertical axis indicates the absolute value of the maximum oscillation angle of movable mirror 210. Calculation conditions such as the resonance frequency (4 kHz) of movable mirror 210 and the volumes (3.6 mm$^3$) of permanent magnets 213 and 213 are similar to those of the calculation shown in FIG. 4.

It can be understood from FIG. 11 that when the axial lengths of permanent magnets 212 and 213 are equal to or less than predetermined lengths, the maximum oscillation angle of movable mirror 210 significantly increases with the increase of the thicknesses of permanent magnets 212 and 213. This is because in permanent magnets 212 and 213, when the axial lengths are fixed, under constant volumes (accordingly constant driving force), the widths decrease in inverse proportion to the thicknesses, thereby lowering the moment of inertia. In other words, according to a change in the moment of inertia, the torsion spring constants of main torsion beams 21 and 22 for acquiring a predetermined resonance frequency (4 kHz) can be reduced (see Equation (1)). As a result, movable mirror 20 can be largely oscillated.

Figure 12:
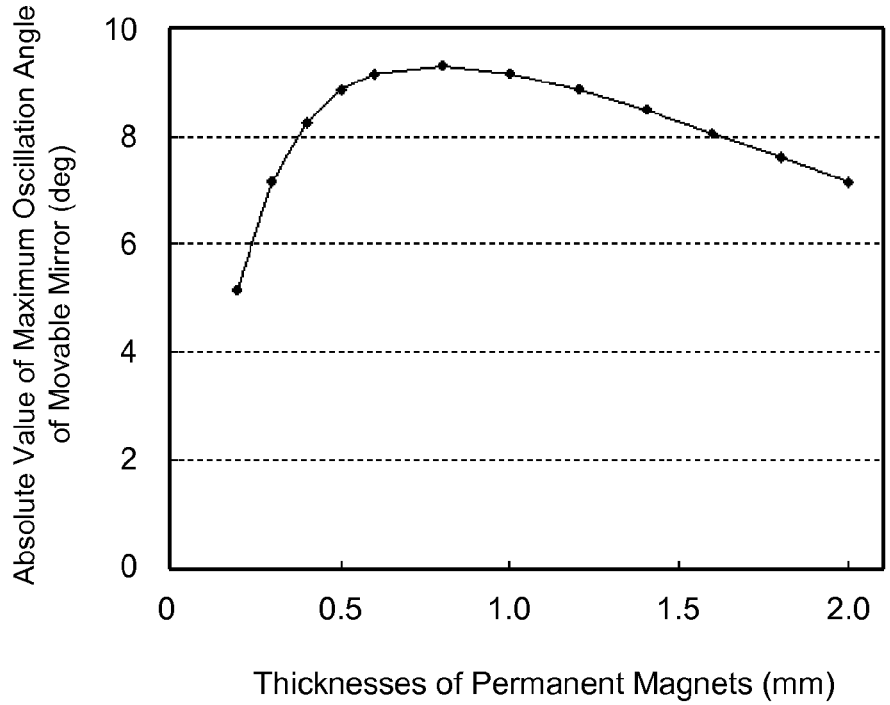
FIG. 12 is a view plotting the absolute value of the maximum oscillation angle of the movable mirror shown in FIGS. 9A to 9C with respect to the thicknesses of the permanent magnets.

FIG. 12 shows a calculation result similar to that shown in FIG. 11, which is plotted with respect to the thicknesses of permanent magnets 212 and 213 when the axial lengths of permanent magnets 212 and 213 are 6 mm.

The maximum oscillation angle of movable mirror 210 reaches a maximum at about 0.8 mm of the thicknesses of permanent magnets 212 and 213. This maximum angle (about 9°) is larger by about 20% than that when the thickness is 0.3 mm. This means that the moment of inertia of permanent magnets 212 and 213 is smallest when the thicknesses thereof are about 0.8 mm. Thus, under the aforementioned conditions, the thicknesses of permanent magnets 212 and 213 are preferably within the range of 0.7 to 0.9 mm.

Fourth Embodiment

Figure 13A:
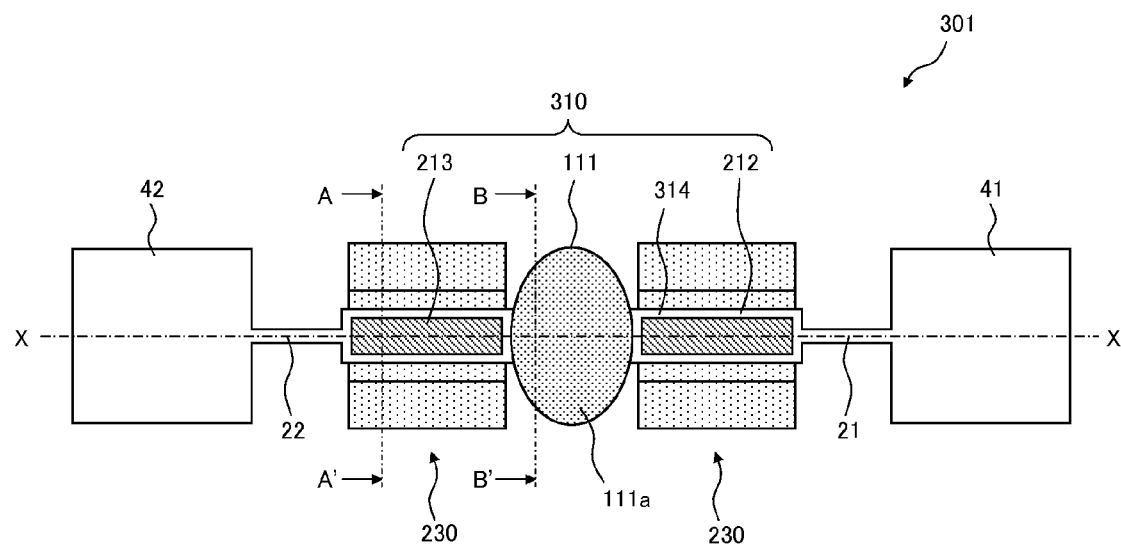
FIG. 13A is a schematic plan view showing the configuration of an optical scanning device according to a fourth embodiment of the present invention.
Figure 13B:
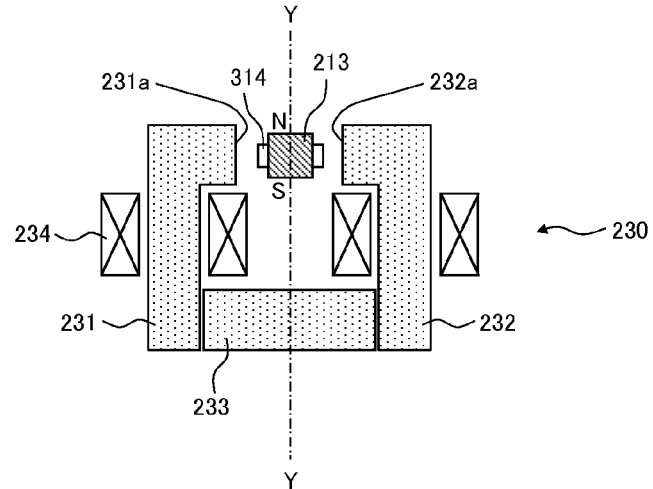
FIG. 13B is a schematic sectional view taken along line A-A' shown in FIG. 13A.
Figure 13C:
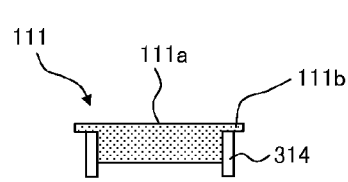
FIG. 13C is a schematic sectional view taken along line B-B' shown in FIG. 13A.

FIGS. 13A to 13C are schematic views showing the configuration of an optical scanning device of a fourth embodiment of the present invention. FIG. 13A is a schematic plan view showing the optical scanning device of this embodiment viewed from a light reflection surface side, corresponding to FIG. 1A. FIGS. 13B and 13C are schematic sectional views respectively taken along line A-A' and line B-B' shown in FIG. 13A.

This embodiment is a modification of the third embodiment where the configuration change of the first embodiment carried out in the second embodiment is carried out. Specifically, mirror unit 11 of the third embodiment (i.e., of the first embodiment) is replaced by mirror unit 111 including flange 111b according to the second embodiment. Accordingly, the size of the elliptical portion of movable frame 314 in which mirror unit 111 is fitted is also changed compared with the third embodiment. However, other components are similar to those of the third embodiment, and a movement mechanism is similar to that of the third embodiment.

Effects provided by this embodiment are similar to those of the second embodiment. Specifically, in this embodiment, when a flange width is 0.8 mm, the maximum oscillation angle of movable mirror 310 is about twice as large as that in the case of 0 mm (i.e., in the third embodiment). For example, when the thicknesses of permanent magnets 212 and 213 are 0.8 mm (where moment of inertia is smallest), the maximum oscillation angle of movable mirror 310 of the third embodiment is ±9° as described above. However, in this embodiment, the angle reaches ±18° (scanning angle±36°), which is about twice as large as that in the third embodiment.

Fifth Embodiment

Figure 14A:
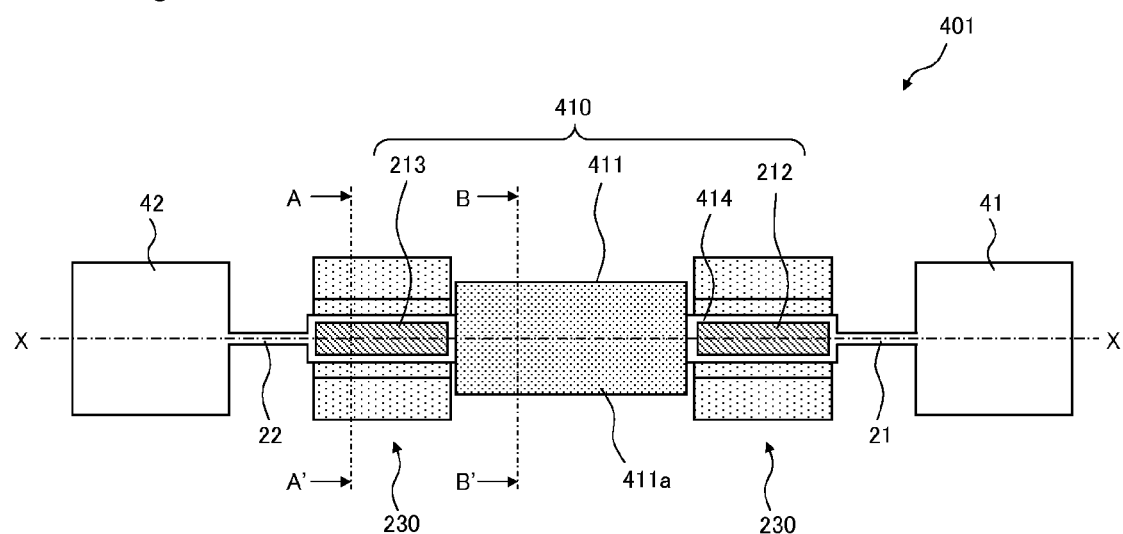
FIG. 14A is a schematic plan view showing the configuration of an optical scanning device according to a fifth embodiment of the present invention.
Figure 14B:
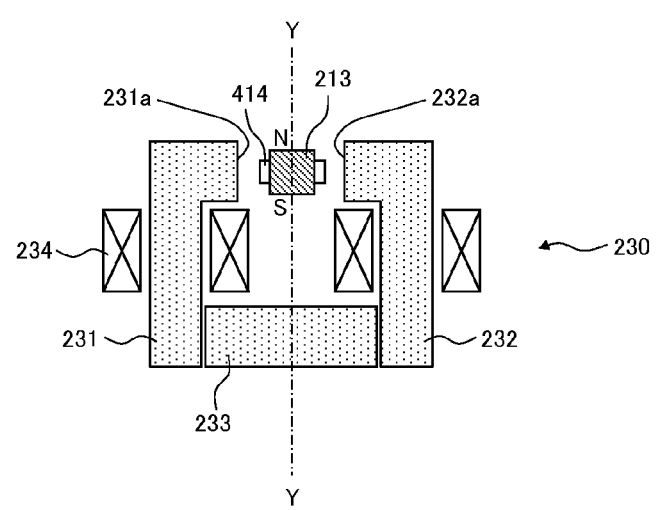
FIG. 14B is a schematic sectional view taken along line A-A' shown in FIG. 14A.
Figure 14C:
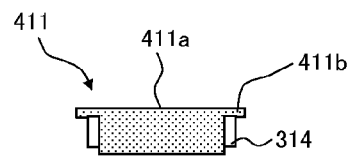
FIG. 14C is a schematic sectional view taken along line B-B' shown in FIG. 24A.

FIGS. 14A to 14C are schematic views showing the configuration of an optical scanning device of a fifth embodiment of the present invention. FIG. 14A is a schematic plan view showing the optical scanning device of this embodiment viewed from a light reflection surface side, corresponding to FIG. 1A. FIGS. 14B and 14C are schematic sectional views respectively taken along line A-A' and line B-B' shown in FIG. 14A.

Externally, this embodiment is a modification of the fourth embodiment where the shape of the mirror unit (accordingly, as well as the movable frame) is changed from elliptical to rectangular. However, unlike the aforementioned embodiments, optical scanning device 401 of this embodiment is a non-resonant type configured to operate at a non-resonant frequency, and is used as scanning mirror P51 of vertical scanning unit P5 of the image display device shown in FIG. 5. Reflection surface 411a of mirror unit 411 is accordingly formed rectangular. The dimensions of mirror unit 411 are, for example, as follows: the short side (mirror width) and the long side (mirror length) of reflection surface 411a are respectively 4 mm and 8 mm, and the thickness is 0.3 mm.

Optical scanning device 401 of this embodiment needs to be non-resonantly driven (i.e., DC-driven, driving frequency of 60 Hz) as described above. This necessitates effective removal of a resonant mode by a low-pass filter. Thus, movable mirror 410 of this embodiment is desirably configured so that the resonant frequency can be about 1 kHz. As material for movable frame 414, molybdenum is preferably used. The dimensions of each of permanent magnets 212 and 213 are, for example, as follows: the axial length is 5 mm, the width is 1 mm, and the thickness is 0.5 mm. In this case, assuming that the magnetization of permanent magnets 212 and 213 and the magnitudes of magnetic fields applied to permanent magnets 212 and 213 are similar to those of the aforementioned embodiments, when the maximum oscillation angle of movable mirror 410 is calculated in the case of a mechanical quality factor of 1, the angle reaches ±13.5° at a flange width of 0.8 mm. This is more than four times as large as the maximum oscillation angle (±3.3°) when the flange width is 0 mm.

Sixth Embodiment

Figure 15A:
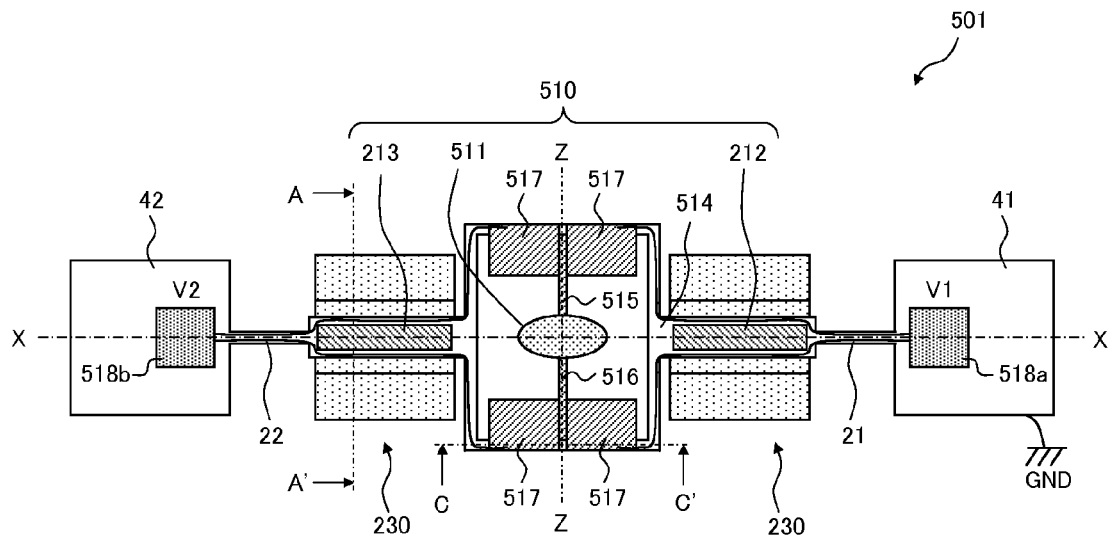
FIG. 15A is a schematic plan view showing the configuration of an optical scanning device according to a sixth embodiment of the present invention.
Figure 15B:
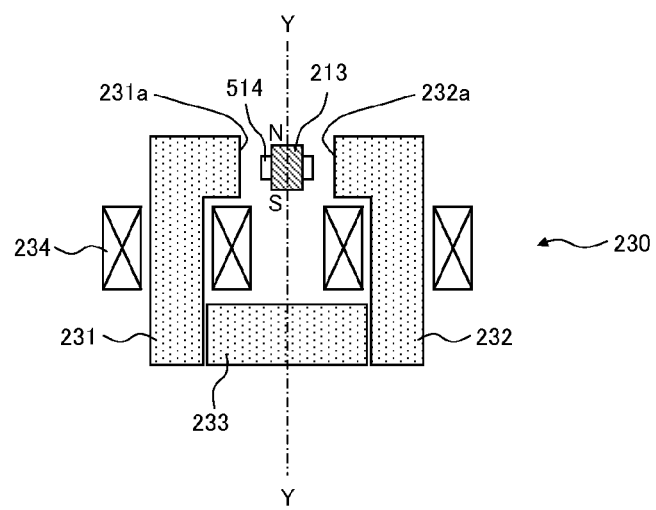
FIG. 15B is a schematic sectional view taken along line A-A' shown in FIG. 15A.
Figure 15C:
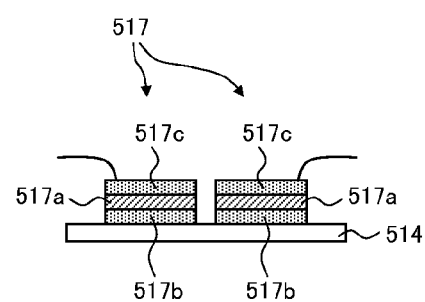
FIG. 15C is a schematic sectional view taken along line B-B' shown in FIG. 15A.

FIGS. 15A to 15C are schematic views showing the configuration of an optical scanning device of a sixth embodiment of the present invention. FIG. 15A is a schematic plan view showing the optical scanning device of this embodiment viewed from a light reflection surface side, corresponding to FIG. 1A. FIGS. 15B and 15C are schematic sectional views respectively taken along line A-A' and line C-C' shown in FIG. 15A.

Optical scanning device 501 of this embodiment is a biaxial optical scanning device. Specifically, as in the case of the fifth embodiment, entire movable mirror 510 is adapted to oscillate about oscillation axis X-X along main torsion beams 21 and 22 in a non-resonant mode. On the other hand, mirror unit 511 is adapted to oscillate, with respect to movable mirror 510, about an oscillation axis which is axis Z-Z extending in a direction substantially orthogonal to oscillation axis X-X in a resonant mode. Thus, in this embodiment, mirror unit 511 can be two-dimensionally oscillated, and light can be two-dimensionally scanned. The configuration where entire movable mirror 510 is oscillated in the non-resonant mode is similar to that of the fifth embodiment except for the thickness of the permanent magnet (and therefore a distance between the gaps in the yoke unit).

Movable mirror 510 of this embodiment is configured to oscillate mirror unit 511 between two permanent magnets 212 and 213 in the resonant mode. Specifically, movable mirror 510 includes a pair of torsionally deformable sub-torsion beams 515 and 516 arranged opposite to each other at both ends of mirror unit 511 and configured to swingably support mirror unit 511, and a sub-driving unit 517 that drives mirror unit 511 to oscillate. Sub-torsion beams 515 and 516 extend in a direction substantially orthogonal to oscillation axis X-X of movable mirror 510. Mirror unit 511 is driven by sub-driving unit 517 to oscillate about oscillation axis Z-Z along the above direction.

Sub-driving unit 517 includes piezoelectric layer 517a that is made of a piezoelectric material (piezoelectric element), and lower and upper electrodes 517b and 517c that are made of Al thin films or other materials such as Pt as electrode pads. As shown in FIG. 15C, lower electrode 517b, piezoelectric layer 517a, and upper electrode 517c are stacked in this order on movable frame 514.

As shown in FIG. 15A, two units each of sub-driving units 517, for a total of four sub-driving units 517, are arranged to sandwich oscillation axis Z-Z. Two sub-driving units 517 on the right (shown in FIG. 15A) with respect to the oscillation axis Z-Z are connected by wires to voltage application means 518a disposed on support 41. The same voltage V1 is accordingly applied to piezoelectric layers 517a. Two sub-driving units 517 on the left (shown in FIG. 14A) with respect to the oscillation axis Z-Z are connected by wires to voltage application means 518b disposed on support 42. The same voltage V2 is accordingly applied to piezoelectric layers 517a. In this case, by setting voltages V1 and V2 to be complementary to each other, mirror unit 511 can be efficiently driven in the resonant mode.

Mirror unit 511, the pair of sub-torsion beams 515 and 516, movable frame 514, and supports 41 and 42 are integrally formed by a moderately rigid material that can be microfabricated (e.g. single-crystal silicon, spring steel, or molybdenum). In this embodiment, to facilitate applying a ground voltage (GND) to lower electrode 517b by physically and electrically connecting lower electrode 517b and movable frame 514, these members are preferably made of metallic materials. The dimensions of mirror unit 511 and the pair of sub-torsion beams 515 and 516 are designed to acquire the desired resonance frequency. As the reflection surface of mirror unit 511, a mirror surface of a metal thin film, etc. having sufficiently high reflectance for light to be used is formed.

In this embodiment, the deforming force of the piezoelectric material (piezoelectric element) is used as a driving force for driving mirror unit 511 to oscillate. However, an electromagnetic force or an electrostatic force can be used.

While the present invention has been described with reference to the embodiments, the present invention is not limited to the embodiments described above. It will be understood by those skilled in the art that various changes in form and details may be made therein without departing from the scope of the present invention as defined by the claims.

The present application is based upon and claims the benefit of priority from Japanese Patent Application No. 2010-261087 filed on Nov. 24, 2010, the disclosure of which is incorporated herein in its entirety by reference.

EXPLANATION OF REFERENCE NUMERALS 1, 101, 201, 301, 401, 501 Optical scanning device
10, 110, 210, 310, 410, 510 Movable mirror
11, 111, 411, 511 Mirror unit
11a, 111a, 411a Reflection surface
12, 13, 212, 213 Permanent magnet
14, 114, 214, 314, 414, 514 Movable frame
21, 22 Main torsion beam
30, 230 Main driving unit
31, 231 First yoke
31a, 231a First end
32, 232 Second yoke
32a, 232a Second end
33, 233 Third yoke
33a Third end
34, 234 Coil
41, 42 Support
111b Flange
515, 516 Sub-torsion beam
517 Sub-driving unit
517a Piezoelectric layer
517b Lower electrode
517c Upper electrode
518a, 518b Voltage application means

The invention claimed is:
1. An optical scanning device comprising:
a main movable portion;
a pair of torsionally deformable main torsion beams arranged opposite to each other at both ends of the main movable portion and swingably supporting the main movable portion; and
a main driving unit that drives the main movable portion to oscillate;

wherein the main movable portion includes a mirror unit having a reflection surface for reflecting light, and a pair of permanent magnets arranged opposite to each other to sandwich the mirror unit, each permanent magnet extending along the oscillation axis of the main movable portion, and wherein the main driving unit includes a yoke unit arranged along the oscillation axis of the main movable portion to surround the permanent magnets, and a coil wound on the yoke unit and configured to be energized to magnetize the yoke unit, thereby generating magnetic fields to be applied on the permanent magnets.

2. The optical scanning device according to claim 1, wherein the permanent magnets are arranged to be substantially rotationally-symmetrical with respect to the oscillation axis of the main movable portion, and are arranged so that magnetization directions can be substantially orthogonal to the oscillation axis of the main movable portion.

3. The optical scanning device according to claim 2, wherein the yoke unit is arranged to be substantially symmetrical with respect to a plane including the oscillation axis of the main movable portion.

4. The optical scanning device according to claim 3, wherein:
the permanent magnets are arranged so that the magnetization directions can be substantially orthogonal to the plane;
the yoke unit includes two ends arranged opposite to each other to sandwich the permanent magnet, and one end arranged opposite to the permanent magnet in a direction substantially orthogonal to the magnetization direction of the permanent magnet; and
the coil is wound on the yoke unit to form, when energized, different magnetic poles in the two ends and the one end.

5. The optical scanning device according to claim 3, wherein:
the permanent magnets are arranged so that the magnetization directions can be substantially parallel to the plane;
the yoke unit includes two ends arranged opposite to each other to sandwich the permanent magnet; and
the coil is wound on the yoke unit to form, when energized, different magnetic poles in the two ends.

6. The optical scanning device according to claim 1, wherein the mirror unit is made of a material whose density is lower than that constituting the pair of main torsion beams.

7. The optical scanning device according to claim 1, wherein the mirror unit is arranged to be substantially rotationally-symmetrical with respect to the oscillation axis of the main movable portion.

8. The optical scanning device according to claim 1, wherein a peripheral edge of the reflection surface of the mirror unit is formed into a flange shape.

9. The optical scanning device according to claim 1, wherein the main movable portion includes:
a pair of torsionally deformable sub-torsion beams arranged opposite to each other at both ends of the mirror unit and swingably supporting the mirror unit, each sub-torsion beam extending in a direction substantially orthogonal to the oscillation axis of the main movable portion; and
a sub-driving unit that drives the mirror unit to oscillate.

10. The optical scanning device according to claim 9, wherein the sub-driving unit has a piezoelectric material.

* * * * *